Patented Aug. 26, 1930

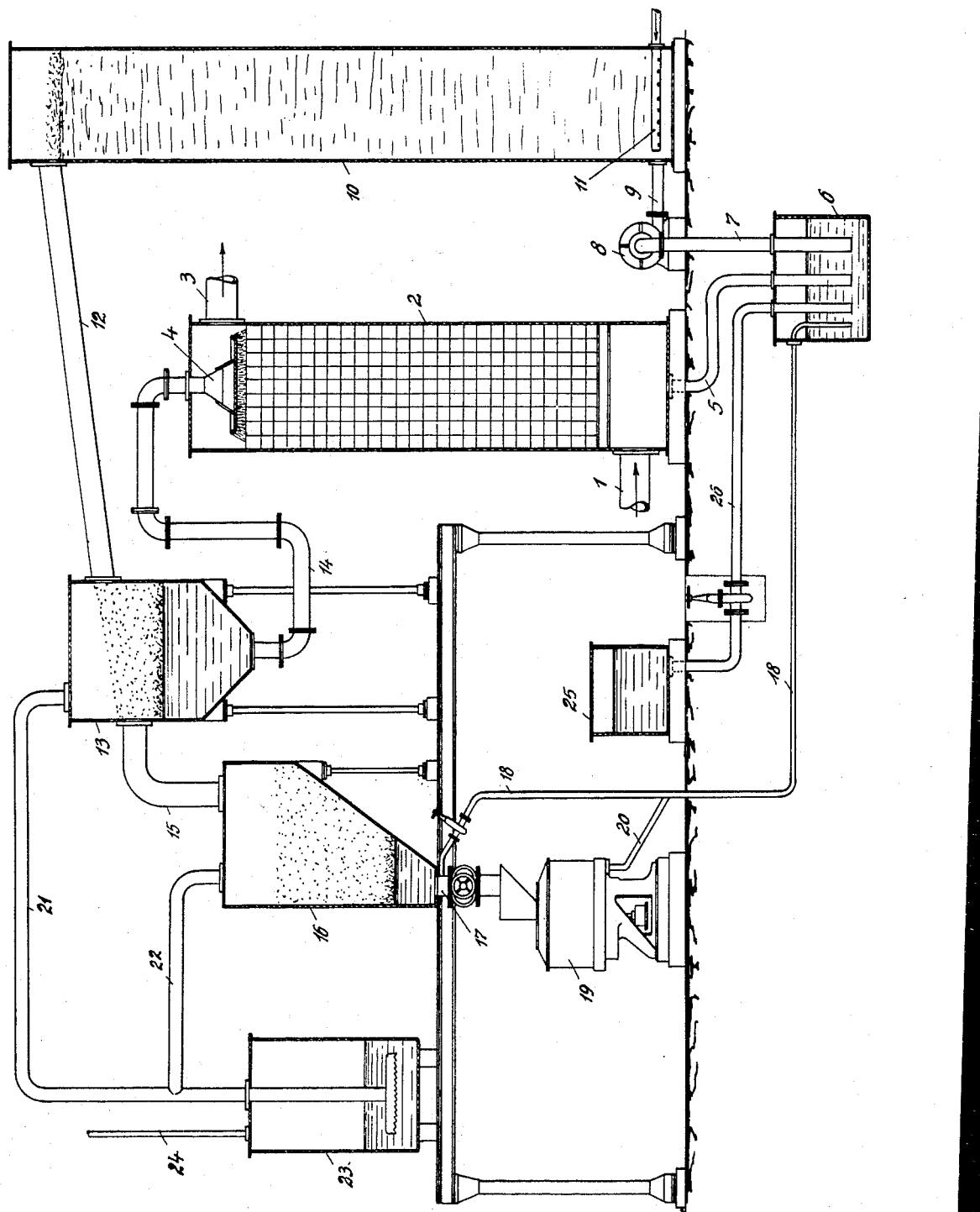

1,774,366

UNITED STATES PATENT OFFICE

WILHELM GLUUD AND ROBERT SCHÖNFELDER, OF DORTMUND-EVING, GERMANY, ASSIGNORS, BY MESNE ASSIGNMENTS, TO FIRM: BERGWERKSVERBAND ZUR VERWERTUNG VON SCHUTZRECHTEN DER KOHLENTECHNIK GESELLSCHAFT MIT BESCHRÄNKTER HAFTUNG, OF DORTMUND-EVING, WESTPHALIA, GERMANY

CHEMICAL APPARATUS

Original application filed November 17, 1926, Serial No. 148,982, and in Belgium May 25, 1926. Divided and this application filed June 5, 1928. Serial No. 283,119.

The present invention refers to the eliminating of sulphuretted hydrogen from gases, in which an aqueous suspension, containing ferrous and ferric hydroxides or carbonates and circulating in a closed circuit, is utilized, in a first step for washing the gas in order to fix the sulphur contained in the gas by means of compounds of iron present in the wash liquid, and in a second step is then oxidized and regenerated by treatment with the oxygen of the air, so that this liquid can be utilized again in the first step for washing the gas.

A process as above described is disclosed in our copending application for patent of the United States Ser. No. 148,982, filed November 17, 1926.

One of the objects of the present invention is to provide means for obtaining in a highly concentrated form, that is, with a relatively small proportion of iron compounds, the sulphur which is present as a mixture of sulphur and solid compounds of iron.

Another object of the invention when wash liquids containing an alkali are used, in which case part of the sulphur is combined to form an alkali thiosulfate, is to provide means for obtaining highly concentrated solutions of this alkali thiosulfate.

The essential characteristics of the invention, by means of which the objects indicated above are obtained, consist in the suspension serving as the wash liquid having a very low concentration in iron, at the most 2 per cent Fe, and circulating in a closed circuit for a sufficiently long time between the process of washing the gas and the process of regeneration, the iron and alkali being replaced as they are used up in the course of the treatment.

The accompanying drawing shows diagrammatically in elevation an example of a plant embodying our invention.

The gases to be treated containing sulphuretted hydrogen, for example a gaseous distillation product from coke furnaces, retorts for illuminating gas, producers, etc., which are preferably, but not necessarily, submitted to a preliminary treatment for the elimination of cyanogen compounds, and in any case freed from tar, enter at the ordinary temperature by a pipe 1 into a vertical scrubber 2 provided with latticework or the like and leave the latter by a pipe 3. When the process is in regular working a wash liquid is sprayed by a device 4 into the top of the scrubber and flows in the opposite direction to the gas. This liquid consists of an aqueous suspension of ferrous and ferric hydroxides or carbonates, which may contain also in solution ferrous or ferric salts, and may also carry with it either dissolved or in suspension the products resulting from the treatment. The maximum amount of iron compounds in the liquid must not exceed 2 per cent, of iron (Fe). When the gas to be treated initially contains ammonia, as is the case in the examples mentioned, it is always possible to submit it before its entrance into the scrubber to preliminary treatments by which its initial content in ammonia is wholly or partially left in the gas to be treated by the present process. In this case the wash liquid in the scrubber 2 absorbs the ammonia of the gas and becomes alkaline. Even without this assumption as to the constitution of the gas, when it is desired for purposes which will be explained later that the liquid should be alkaline, satisfactory results can be obtained by adding the required alkali to the wash liquid, for example, as a solution of sodium carbonate or sodium hydroxide, or, if ammonia is to be used as the alkali, in the form of a concentrated ammoniacal solution.

In consequence of the action of the compounds of ferrous and ferric oxides of the suspension in the scrubber 2 on the gas containing sulphuretted hydrogen, the sulphur of the gas combines with the iron in a manner well known to every chemist, and is carried in this form with the wash liquid out of the scrubber 2 and passes by a pipe 5 provided at the bottom of the scrubber into a receptacle 6. The liquid is removed from this latter by a pump 8 through a suction pipe 7, and delivered by a pipe 9 into the bottom of a tower 10. At the bottom of this tower there is a perforated pipe 11 by means of which compressed air is introduced. The air rises in a finely divided state through the column of liquid which completely fills the tower and oxidizes the compounds of iron and sulphur. The products of this oxidation are, as is well known, free sulphur which remains in suspension in the liquid and hydroxides or carbonates of iron, which have been reoxidized to ferric hydroxides or carbonates, and in this form are suitable for repeating the washing and fixing of the sulphur in the scrubber 2, so that the wash liquid is again regenerated. When an alkali, for example free ammonia, is present in the wash liquid, an alkali thiosulfate is formed in the oxidizing tower 10 from the sulphur present, that is, in the case of ammonia, ammonium thiosulfate in solution. In other words, one part of the sulphur passes in the dissolved condition into the wash liquid. The oxidized and regenerated wash liquid passes with the rest of the oxidizing air from the upper part of the tower 10 by a suitably large pipe 12 into a separating receptacle 13. This mixture of liquid, of matters in suspension and of air forms a mass partly in a frothy condition and partly semi-liquid which is separated by settling in the receptacle 13. The liquid constituents with the regenerated ferric compounds in suspension and part of the sulphur fall to the bottom of the vessel and are delivered by a pipe 14 to the spraying device 4 at the top of the scrubber 2. In this way a closed circuit is provided for the wash liquid through the scrubber 2, the oxidizing tower 10 and the separating receptacle 13. The rest of the sulphur which is precipitated in the wash liquid in the tower 10 and is transferred to the receptacle 13, but is not returned to the scrubber 2, forms a mobile foam floating on the surface of the current of liquid. This foam, formed principally of finely divided sulphur with which is mixed a portion of the solid compounds of iron, flows from the receptacle 13 by a large pipe 15 into a depositing receptacle 16. The receptacle 16 is preferably, as shown in the drawing, tapered towards the base, like a funnel, and has at its lowest part a discharge tubulure 17 which can be closed. From this tubulure 17 a pipe 18, which is also furnished with a valve leads to the receptacle 6. The small quantities of liquid which collect at the lower part of the receptacle 16 can be returned by the pipe 18 to the receptacle 6 before the foam deposited in 16 and the mass of sulphur and iron compounds mixed with the liquid have been discharged by the tubulure 17. This mixture passes into a centrifuge 19 in which the rest of the liquid is eliminated by centrifugal action. The expelled liquid is carried by a pipe 20 into the pipe 18 and thence into the receptacle 6. The separated out sulphur remains in the centrifuge 19, mixed with a part of the compounds of iron (hydroxides, carbonates), these latter being thus withdrawn from the cycle, and forms the crude sulphur which is sent to its ulterior place of utilization and possibly to a purifying device.

The remaining oxidizing air which is separated in the receptacle 13 is discharged by a pipe 21 and joins the air escaping from the receptacle 16 by a pipe 22, and as this air carries with it a little ammonia from contact with the ammoniacal wash liquid in the oxidizing tower 10, it is sent into an acid receptacle 23 to combine and recover the ammonia. The air freed from ammonia escapes into the atmosphere by a discharge pipe 24.

The iron extracted with the crude sulphur must naturally be replaced. It is introduced most simply in the operation in the form of a solution of ferrous or ferric salt, for example sulfate of iron ($FeSO_4 + 7$ aq). For the preparation of this solution a receptacle 25 is used which is connected to the receptacle 6 by a pipe 26 provided with a closing member. When the process is carried out with an alkaline wash liquid, it is sufficient to pass the solution of iron salt directly from the receptacle 25 into the receptacle 6, where the dissolved iron salt is transformed under the action of the alkali present into solid hydroxide or carbonate in suspension. When the process is carried out in the absence of alkali, the transformation of the additional iron in solution into hydroxide or carbonate of iron should be effected in the receptacle 25 by the addition of a suitable quantity of alkali.

At the commencement of the operation, the wash liquid in circulation only contains, besides the alkali that may be present (for example ammonia present in the gas to be treated) a certain quantity of ferrous hydroxide or carbonate in suspension, but as yet no sulphur. In the course of the operation the sulphur is extracted from the gas by washing, fixed by the compounds of iron and freed in consequence of the subsequent oxidation as sulphur in suspension, and in part also as an alkali thiosulfate in solution. Of this sulphur which the wash liquid carries with it mechanically a part only is separated by a single passage through the receptacle 13. The rest of the sulphur returns with the wash liquid into the closed circuit. It is evident that in this manner by the frequent repetition of the cycle, the content of the wash liquid in sulphur is continually increased. The content of the wash liquid in iron compounds, is, on the other hand, constantly maintained at the low concentration mentioned. In this manner, by a sufficiently prolonged or sufficiently repeated circulation of the wash liquid between the processes of washing the gas in the scrubber 2 and oxidation and regeneration in the tower 10, the content of the wash liquid in sulphur held in suspension is several times, for example about five times or more, the content of the iron also present in the wash liquid, this iron taking the form of compounds in suspension. Thus crude sulphur containing relatively small quantities of solid iron compounds is recovered in the receptacles 13 and 16. Obviously, also the consumption of the iron required in the process is reduced. This is due to the fact that from the commencement there is only a feeble concentration of iron in the wash liquid in circulation. Consequently, even when the quantity of sulphur is a multiple of the quantity of iron contained in the liquid, the accumulation of matter in suspension in this liquid remains within limits which do not injuriously affect the process. It is only when these conditions are fulfilled that the repeated circulation of the wash liquid can be effected for as long a time and as frequently as is necessary, according to the preceding explanations, in order to obtain as a product a crude sulphur with a high content in sulphur, which obviously then allows the subsequent treatment to be carried out very economically.

When the operation is conducted by means of an alkaline liquid, it is also possible, by the means described, in particular by the use for a sufficiently long time and repeated circulations of the wash liquid in a closed circuit, to obtain highly concentrated alkali thiosulfate solutions, that is to say to recover in dissolved form a considerable part of the eliminated sulphur.

As the thiosulfate is present in solution, it is necessary for its separation and its treatment to withdraw at times part of the wash liquid in circulation from the process, or alternatively, to withdraw and renew all of it at one operation. In this latter case it is possible to recover easily also at once all the sulphur accumulated in the wash liquid, for example by filtration. Therefore, the treatment for obtaining the thiosulfate is also advantageous in many respects for the production of sulphur.

We wish it to be understood that we do not desire to be limited to the exact details of construction and process shown and described for obvious modifications will occur to a person skilled in the art.

We claim:—

Apparatus for carrying out the cyclic process for eliminating sulphuretted hydrogen from gas comprising in combination a scrubber for washing the gas, a relatively high oxidizing tower adapted to receive the liquid from the scrubber at the bottom a column of liquid completely filling and rising under pressure in said tower and means for introducing air from below into this rising column of liquid in the oxidizing tower, and a receptacle connected to the upper end of the oxidizing tower adapted to receive therefrom and separate the wash liquid and sulphur formed in said tower.

In testimony whereof we affix our signatures.

WILHELM GLUUD.
ROBERT SCHÖNFELDER.